United States Patent [19]

Tazi et al.

[11] Patent Number: 5,378,290
[45] Date of Patent: Jan. 3, 1995

[54] FLUX

[75] Inventors: Mohammed Tazi, Marietta; David W. Hilbig, Powder Springs, both of Ga.

[73] Assignee: Morgan Crucible Company plc, Windsor, England

[21] Appl. No.: 110,112

[22] Filed: Aug. 20, 1993

[51] Int. Cl.$^6$ ............................................. B23K 35/34
[52] U.S. Cl. ......................................... 148/23; 148/25
[58] Field of Search .................... 148/23–25; 228/18

[56] References Cited

U.S. PATENT DOCUMENTS

| | | | |
|---|---|---|---|
| 2,471,451 | 5/1949 | Rinkenbach | 148/25 |
| 2,575,413 | 11/1951 | Franklin | 148/25 |
| 3,459,606 | 8/1969 | Becker | 148/25 |
| 3,627,191 | 12/1971 | Hood, Jr. | 228/19 |
| 4,194,931 | 3/1980 | Zado | 148/25 |
| 4,290,824 | 9/1981 | Cole | 148/25 |
| 5,004,509 | 4/1991 | Bristol | 148/23 |
| 5,176,759 | 1/1993 | Taguchi | 148/25 |

OTHER PUBLICATIONS

Material Safety Data Sheet for the Superlo Solids 11W Flux (effective Mar. 15, 1990; four pages).
Technical Data Sheet for the Superlo Solids 11W Flux of the London Chemical Company, Inc. (copyright 1990; two pages).
U.S. Military Specification MIL-F-14256E (Jun. 1, 1989; eighteen pages).
U.S. Military Standard MIL-STD-883B, Method 2022 (Aug. 31, 1977; three pages).
S. Taylor, "Complex synthetic fluxes offer enhanced no-clean performance," *Electronic Production* (Oct. 1991; three pages).
Brochure for Multicore X32 No Residue Flux (possibly bearing the date Oct. 15, 1989; four pages).
Brochure for Multicore Halide Free X33 No Residue Flux (undated; two pages).
Brochure for Xersin Wick (possibly bearing the date Jan. 5, 1982; two pages).
Brochure for Kester #952 SM Flux (the third page bearing the date Feb. 7, 1992; three pages).

*Primary Examiner*—Peter D. Rosenberg
*Attorney, Agent, or Firm*—Kilpatrick & Cody

[57] ABSTRACT

A composition of matter useful particularly as a desoldering flux is disclosed. In some embodiments the invention combines a "low solids" flux normally provided for automatic wave and other soldering equipment with additional naturally-occurring rosin to create a composition capable of use with copper desoldering braid and manual desoldering operations.

20 Claims, 1 Drawing Sheet

FLUX

This invention relates to a flux and more particularly to a coating for desoldering braid or wicks designed to leave minimal rosinous residue at desoldered joints.

BACKGROUND OF THE INVENTION

Existing desoldering technologies typically involve use of one or more of hot air (or infrared) reflow equipment, vacuum bulbs or stations, or copper wicks. Reflow equipment is designed to melt all solder joints for a particular electronic component concurrently, facilitating relatively rapid removal of the component from a printed circuit or equivalent board. Reflow equipment does not remove the solder from the board, however, requiring use of another technique to do so before the removed component is replaced.

Vacuum bulbs or stations, by contrast, use suction to remove heated solder directly from joints on boards and transfer the removed solder to suitable waste reservoirs. The suction provided by this technique is not always effective to remove all of the solder from various joints, however, again requiring use of another technique to do so before the selected component can be replaced. Solder removal using vacuum techniques also does not typically or necessarily occur as the solder becomes molten, resulting in excess heat being applied to the board before removal transpires. This excess heat can in some cases damage either or both of the board and its electronic components, potentially degrading performance of the overall circuit.

Solder wicks provide another mechanism for desoldering joints. As disclosed in U.S. Pat. No. 3,627,191 to Hood, Jr., such wicks are generally comprised of copper strands having an exterior capillary surface. In use, the wick contacts a solder joint heated (through the wick) with a soldering iron or other heat source. The heated solder melts and is drawn up onto the wick by capillary forces.

The Hood, Jr. patent additionally discloses use of a now-conventional flux solution as a coating for the solder wick. As discussed therein, a solution of about twenty-five parts by weight of rosin dissolved in about seventy-five parts by weight of a 4:1 volume mixture of methyl acetate to methyl alcohol forms a particularly effective flux. Other noncorrosive fluxes such as the methyl esters of abietic and pimaric acids are also mentioned in the Hood, Jr. patent as potentially effective for various purposes.

Conventional rosinous fluxes can in some cases impart significant residue when used with desoldering wicks to remove solder from printed circuit boards, for example. Because plastic and other coatings for printed circuit boards will not conform to rosinous areas, this residue must often be cleaned before such coating can occur. Tacky rosinous residues are typically aesthetically unappealing and tend to collect dust and metal particles (which can sometimes lead to short circuits), moreover, resulting in other reasons to avoid imparting the residue onto printed circuit boards. Decreasing the residue also promotes diminished use of chlorofluorocarbons (CFCs), the principal cleaning agent currently in use.

Various "low solids" fluxes are commercially available for soldering (rather than desoldering) electronic components, particularly using automatic wave soldering equipment. These soldering fluxes can include compounds that form noxious fumes when heated, essentially limiting use to equipment having appropriate ventilation systems. These soldering fluxes also aggressively react with and corrode copper surfaces (particularly at high humidities and temperatures), potentially degrading the capillary action of desoldering wicks. As a result, they are not employed to coat desoldering braid, which is used to remove solder manually.

One "low solids" flux available for automatic wave soldering is the Superlo Solids 11W Flux, sold as Item No. NR011 by the London Chemical Company, Inc., 240 Foster Avenue, Bensenville, Ill. 60106. According to a Material Safety Data Sheet provided by that company for the product (effective Mar. 15, 1990), Superlo Solids 11W Flux includes 97.7% by weight of volatile materials (such as isopropyl alcohol/2-propanol). Solids, therefore, comprise no more than 2.3% by weight of the flux. The Superlo Solids 11W Flux is currently believed by the applicant to meet or exceed Section 3.2.2 of U.S. Military Specification MIL-F-14256E (Jun. 1, 1989), furthermore, requiring that at least 51.0% of the non-volatile solids be naturally-occurring rosins. Accordingly, it is anticipated that the Superlo Solids 11W Flux includes approximately 1.16% by weight of naturally-occurring gum rosin and up to approximately 1.14% by weight of subliming solid organic acids.

U.S. Pat. No. 5,004,509 to Bristol (incorporated herein by this reference), by contrast, discloses a soldering flux containing a non-subliming dibasic acid mixture composed principally of glutaric acid in a volatilizing organic solvent. According to the Bristol patent, the acid mixture can volatilize during the soldering process, leaving a soldered product essentially free from corrosion-promoting ionic residue. Because the flux includes substantial quantities of succinic acid, however, like many other automatic soldering fluxes it too is subject to forming noxious fumes when heated.

Additionally, experiments conducted with formulations of the Bristol patent required an alcohol carrier to be heated to more than 120° F. before adding the quantities of acids described therein. Otherwise, the acids tended not to solubilize, but rather to precipitate out as the solution cooled. Such required heating of the alcohol carrier increases the possibility of explosion and fire, making the mixture less suitable for large-scale manufacture absent specialized explosion-proof areas and equipment.

SUMMARY OF THE INVENTION

The present invention is a composition of matter useful particularly as a manual desoldering flux. The composition generally includes a mixture of subliming organic solid acids (in contrast to the non-subliming solid acid mixture disclosed in the Bristol patent), volatile materials, and approximately 1–20% (by weight) naturally-occurring rosins. By combining additional naturally-occurring gum or other rosin with a "low solids" soldering flux such as the Superlo Solids 11W Flux, the invention permits these soldering fluxes to be used satisfactorily with copper desoldering braid in manual desoldering operations.

In one embodiment of the invention, the Superlo Solids 11W Flux is combined with 2.5% by weight American gum rosin (type R, water white grade) and coated on desoldering braid such as the copper wick described in the Hood, Jr. patent. Other embodiments include differing quantities of naturally-occurring gum or other rosins, although less than the twenty-five parts per hundred disclosed in the Hood, Jr. patent.

Unlike "low solids" soldering fluxes, the composition of the present invention neither develops excessive noxious fumes when heated nor significantly degrades the capillary action of copper desoldering braids, even when stored at 90° F. and 90% relative humidity for thirty-five days. Consequently, the present composition permits rapid solder removal, providing improved wetting (desoldering) speeds over other commercial desoldering fluxes. The composition also leaves relatively little rosinous residue on printed circuit boards and other materials when used as a coating for desoldering braid, permitting those boards or materials to be coated with plastic, for example, or reused without having to be cleaned with CFCs. Desoldering braid shelf life additionally is increased through use of the present composition, as is the braid's stability during handling and winding.

It is therefore an object of the present invention to provide a composition of matter useful as a desoldering flux.

It is another object of the present invention to provide a desoldering braid imparting minimal rosinous residue when used in connection with printed circuit boards or other similar materials.

It is a further object of the present invention to provide a desoldering braid providing improved wetting (desoldering) speeds over other typical commercial desoldering braids.

It is an additional object of the present invention to provide a desoldering braid that remains stable over relatively long periods of time, improving its shelf life and handling and winding characteristics.

It is yet another object of the present invention to provide a flux that, when in use, produces less noxious fumes than numerous other products.

It is a further object of the present invention to provide a flux in which the subliming solid organic acid solubilizes even when the volatile materials are not heated to a temperature greater than approximately 120° F.

Other objects, features, and advantages of the present invention will become apparent with reference to the remainder of the written portion and the drawings of this application.

DETAILED DESCRIPTION

Figure 1:
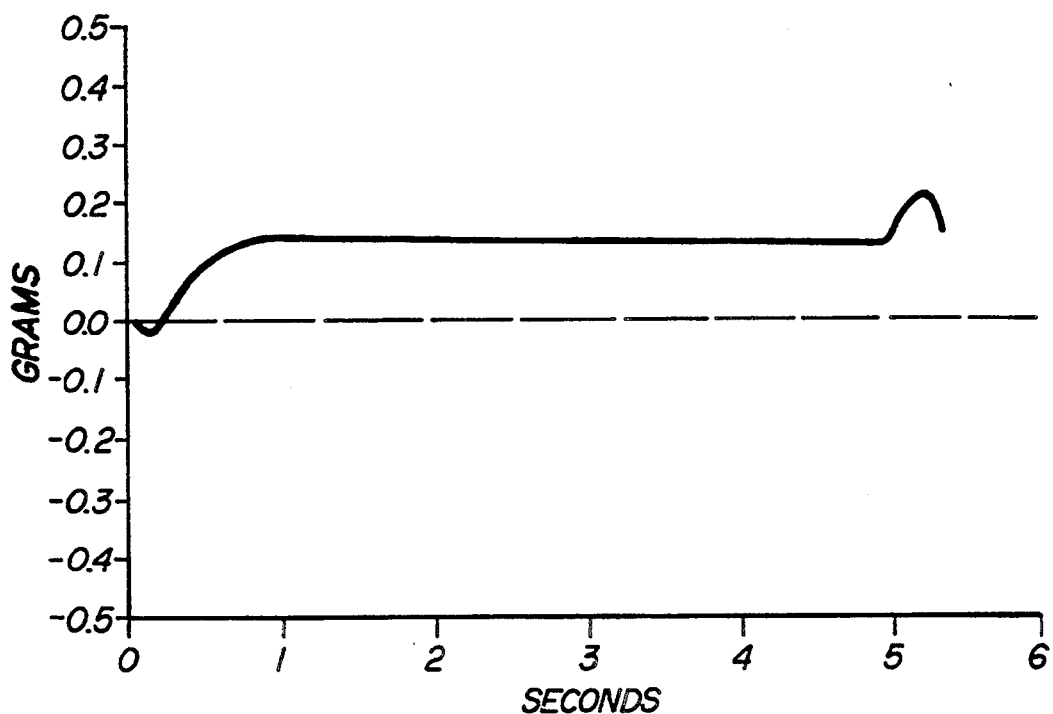
FIG. 1 is a graph presenting results of the wetting speed test performed pursuant to U.S. Military Standard MIL-STD-883B, Method 2022 (Aug. 31, 1977) for a desoldering braid coated in accordance with the present invention.

The present invention is a composition designed principally to provide a low-residue desoldering flux having improved stability and wetting speed. The invention generally includes a quantity of subliming organic solid acids combined with volatile materials and a selected amount of additional gum or other rosin, producing a composition not only suitable for use as a desoldering flux, but meeting U.S. Military Specification MIL-F-14256E as well. Moreover, the composition could be used for other purposes, including as an automatic or manual soldering flux, if necessary or desired.

One embodiment of the present invention is composed of Superlo Solids 11W Flux combined with 2.5% by weight of naturally-occurring gum rosin (type R, water white grade). Other embodiments can include differing amounts and types of naturally-occurring rosins. The percentage "$\phi$" of naturally-occurring rosin added to the Superlo Solids 11W Flux, however, is less than 25% by weight, and typically will be less than 15–20%. To ensure minimal rosinous residue when used as a desoldering flux, moreover, the value of $\phi$ should often be less than or equal to 10% by weight.

According to the Material Safety Data Sheet (effective Mar. 15, 1990) provided by the London Chemical Company for the Superlo Solids 11W Flux, that product includes 97.7% by weight volatile materials (such as isopropyl alcohol/2-propanol). As a result, no more than 2.3% by weight of the flux is composed of solid materials, and the maximum percentage by weight of gum rosin "$\epsilon_{MAX}$" present in the composition of the present invention is approximately:

$$\epsilon_{MAX} = \phi + 2.3$$

Moreover, because the Superlo Solids 11W Flux is believed by the applicant to meet U.S. Military Specification MIL-F-14256E requiring at least 51.0% by weight of the non-volatile material to be naturally-occurring rosin, the minimum percentage by weight of rosin "$\epsilon_{MIN}$" present in the composition of the present invention is believed to be:

$$\epsilon_{MIN} = \phi + (0.51 \times 2.3) = \phi + 1.16$$

At least part of the remaining non-volatile materials in the Superlo Solids 11W Flux are understood to be subliming organic (carboxylic or dicarboxylic) solid acids such as adipic or benzoic acid. Accordingly, the maximum percentage by weight of such one or more subliming organic solid acids "$\delta_{MAX}$" is understood to be approximately:

$$\delta_{MAX} = (0.49 \times 2.3) = 1.14$$

By having an increased quantity of naturally-occurring rosin mixed with the Superlo Solids 11W Flux, the composition of the present invention provides sufficient coating for desoldering braid to prevent excess oxidation and corrosion or degradation of the copper surface of the braid. This is turn increases the shelf life and stability of the composition, since oxidation inhibits the desoldering capability of the braid. Satisfactory performance of one embodiment, for example, was achieved even after storage for sixty days at 90° F. and 90% relative humidity. The increased rosin content additionally reduces the noxious fumes created when the composition is heated, permitting or facilitating its use in manual desoldering environments.

Concurrently, including the more aggressive solid, subliming acids in the composition increase the wetting (desoldering) speed of the composition over conventional rosinous and other desoldering fluxes. As shown in FIG. 1, tests performed pursuant to U.S. Military Standard MIL-STD-883B, Method 2022 involving desoldering braid (such as that described in the Hood, Jr.

patent) coated with the composition of the present invention yielded the following values:

$T_1 = 0.28$ seconds $T_2 = 0.56$ seconds, where $T_1$ is defined as the time at which the recorded trace crosses the zero balance point and $T_2$ is the time at which the recorded trace reaches its maximum meniscus force point. The values shown in FIG. 1 are well within those for $T_1$ and $T_2$ permitted by Section 3.5 of U.S. Military Standard MIL-STD-883B, Method 2022. According to that standard (which is incorporated herein in its entirety by this reference), acceptable values for $T_1$ are 0–0.59 seconds, while those for $T_2$ are 0–1.0 second.

Figure 2:
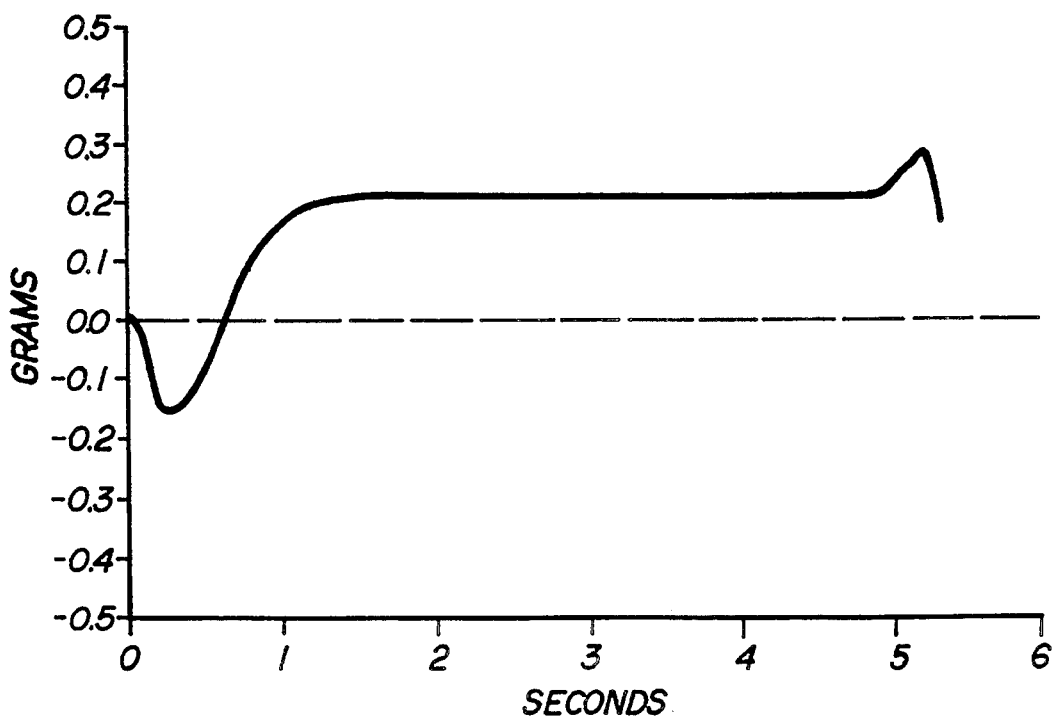
FIG. 2 is a graph presenting results of the wetting speed test performed pursuant to U.S. Military Standard MIL-STD-883B, Method 2022 for a commercially-available desoldering braid coated other than in accordance with the present invention.

By contrast, FIG. 2 illustrates results of a similar test performed for a commercially-available desoldering braid coated with a flux including a synthetic resin. As shown in FIG. 2, for this product $T_1$ and $T_2$ are, respectively, 0.65 and 1.03 seconds, representing substantially slower wetting speeds and exceeding the times permitted by the relevant military standard.

The foregoing is provided for purposes of illustrating, explaining, and describing embodiments of the present invention. Modifications and adaptations to these embodiments will be apparent to those of ordinary skill in the art and may be made without departing from the scope or spirit of the invention.

What is claimed is:

1. A composition of matter in the form of a subliming mixture consisting essentially of, by weight, $\epsilon\%$ naturally-occurring rosin, $\delta\%$ subliming organic solid acid, and volatile materials, where $1.16 < \epsilon <$ approximately 20 and $\delta > 0$.

2. A composition according to claim 1 in which $\epsilon > 2.3$.

3. A composition according to claim 2 further comprising means for facilitating its coating onto desoldering wick.

4. A composition according to claim 3 in which the desoldering wick coating facilitating means comprises a volatile material.

5. A composition according to claim 4 in which the subliming solid organic acid solubilizes even when the volatile material is not heated to a temperature greater than approximately 120° F.

6. A desoldering wick comprising:
   a. a plurality of interconnected copper strands; and
   b. a coating for the strands consisting essentially of, by weight:
      i. $\epsilon\%$ naturally-occurring rosin;
      ii. $\delta\%$ subliming solid organic acid; and
      iii. volatile materials;
   where $0 < \epsilon < 25$ and $\delta > 0$.

7. A wick according to claim 6 in which $1.16 < \epsilon < 25$.

8. A wick according to claim 7 in which $2.3 < \epsilon < 20$.

9. A wick according to claim 8 in which $\delta < 2.3$.

10. A wick according to claim 9 in which the naturally-occurring rosin is gum rosin (type R, water white grade) and $\epsilon = 3.66$.

11. A wick according to claim 10 in which the plurality of copper strands are interconnected by braiding.

12. A solder joint desoldering wick comprising:
    a. a plurality of braided copper strands; and
    b. a subliming coating for the strands consisting of, by weight:
       i. $\epsilon\%$ naturally-occurring rosin;
       ii. $\delta\%$ subliming solid organic acid; and
       iii. $\Theta\%$ volatile materials,
    where $2.5 < \epsilon < 10$, $0 < \delta < 2.3$, and $\Theta = 100 - \epsilon - \delta$, and
    which wick is adapted for use in manual desoldering environments, to impart minimal rosinous residue to the solder joint during use, and to have $T_1$ and $T_2$ values of less than 0.59 and 1.0 seconds, respectively.

13. A solder joint desoldering wick according to claim 12 in which the subliming solid organic acid solubilizes even when the volatile materials are not heated to a temperature greater than approximately 120° F.

14. A composition according to claim 1 in which $\delta > 2.3$.

15. A composition according to claim 1 in which $\delta < 1.14$.

16. A composition according to claim 1 in which the subliming solid organic acid is selected from the group consisting of adipic acid and benzoic acid.

17. A composition according to claim 1 in which the subliming solid organic acid is benzoic acid.

18. A desoldering wick according to claim 6 in which $\epsilon <$ approximately 20.

19. A desoldering wick according to claim 18 in which the subliming solid organic acid is selected from the group consisting of adipic acid and benzoic acid.

20. A desoldering wick according to claim 19 in which $\epsilon < 10$.

* * * * *